United States Patent [19]

Neilson

[11] Patent Number: 5,327,251
[45] Date of Patent: Jul. 5, 1994

[54] IMAGE SCANNING APPARATUS

[75] Inventor: Peter J. Neilson, Shroud, United Kingdom

[73] Assignee: A.B. Dick Company, Niles, Ill.

[21] Appl. No.: 575,015

[22] Filed: Aug. 30, 1990

[30] Foreign Application Priority Data

Sep. 8, 1989 [GB] United Kingdom ............... 8920404

[51] Int. Cl.⁵ .................................................. G04N 1/40
[52] U.S. Cl. ................................... 358/404; 358/497; 358/472
[58] Field of Search ............... 358/486, 489, 493, 494, 358/497, 496, 451, 401, 448, 449, 474, 490, 495, 472, 404, 444; 382/47

[56] References Cited

U.S. PATENT DOCUMENTS

| | | | |
|---|---|---|---|
| 3,816,652 | 6/1974 | Barnett | 358/472 |
| 4,205,348 | 5/1980 | DeBenedictis et al. | 358/493 |
| 4,616,268 | 10/1986 | Shida | 382/47 |
| 4,672,464 | 6/1987 | Shida | 382/47 |
| 5,053,885 | 10/1991 | Telle | 358/449 |

FOREIGN PATENT DOCUMENTS

| | | | |
|---|---|---|---|
| 1166091A | 10/1969 | United Kingdom | H04N 1/02 |
| 2037532A | 7/1980 | United Kingdom | H04N 1/02 |
| 2141893A | 1/1985 | United Kingdom | H04N 1/02 |

Primary Examiner—Mark R. Powell
Assistant Examiner—Jerome Grant, II
Attorney, Agent, or Firm—Leydig, Voit & Mayer, Ltd.

[57] ABSTRACT

An image scanning apparatus comprises an input image scanner for scanning an input image area with a beam of radiation and deriving from an image on at least part of the input image area a digital signal representing the image, and an output image scanner for reproducing from said signal an output image on at least part of an output image area. The input image scanner and the output image scanner are arranged to scan the input and output image areas respectively simultaneously at a fixed relative rate, and the output and input images are represented as a series of pixels arranged in orthogonal directions at fixed resolutions. In the data path between the input and output scanners the digital signal is processed to change the size of the output image relative to the input image by using a data store whose data capacity is substantially less than that required to hold data corresponding to an image covering the whole of the input image area.

4 Claims, 2 Drawing Sheets

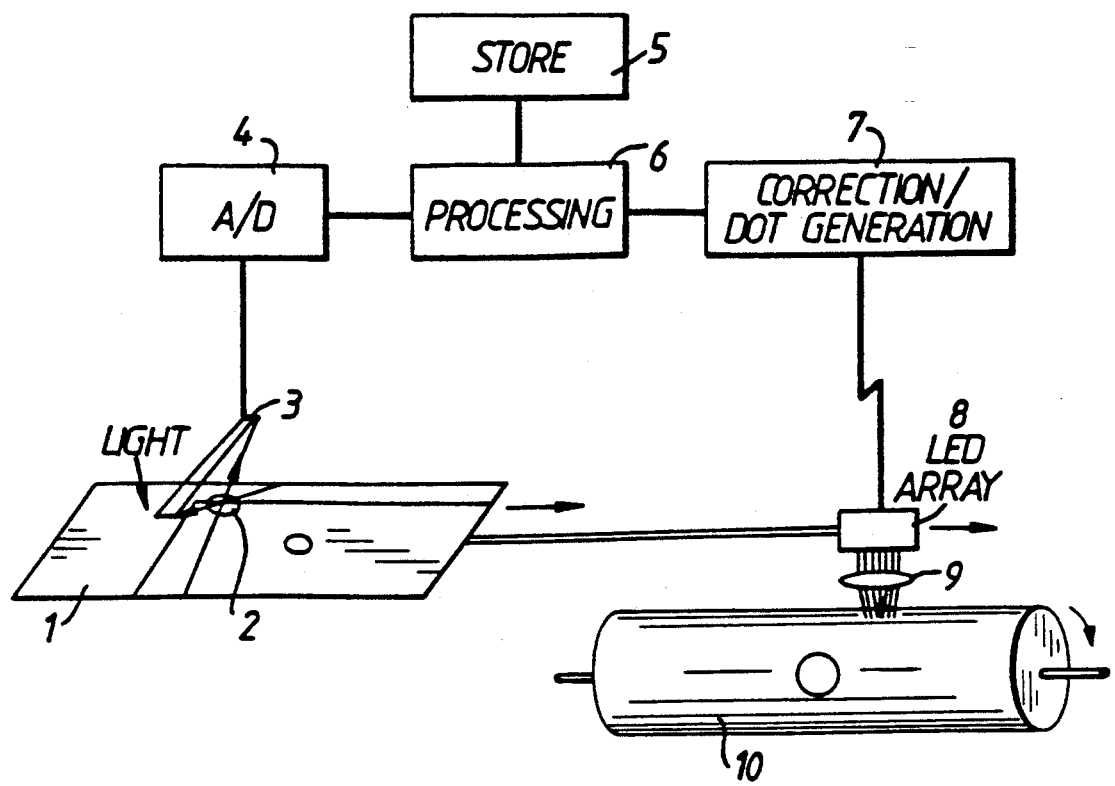
FIG. 1
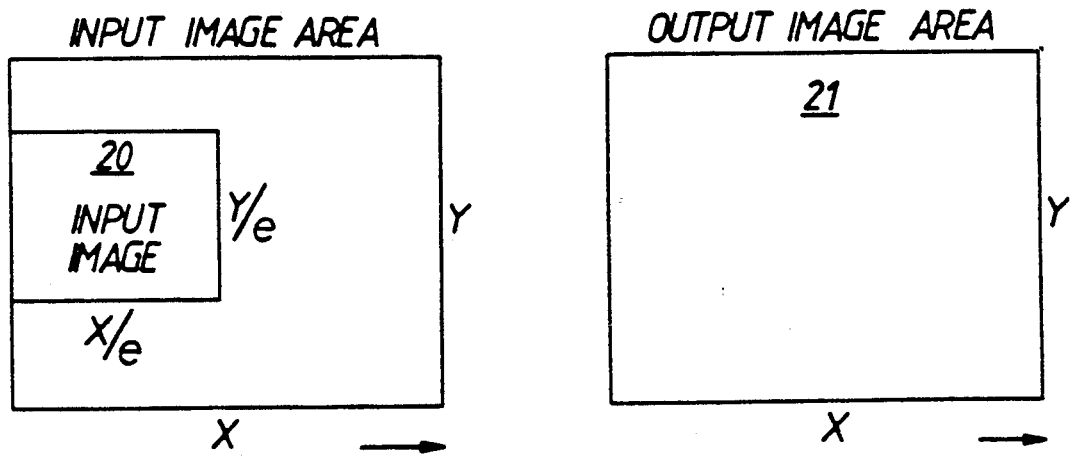
FIG. 2A
FIG. 2B

IMAGE SCANNING APPARATUS

FIELD OF THE INVENTION

This invention relates to an image scanning apparatus, for example for producing half-tone images from a continuous tone original and/or producing colour separations, on an enlarged or reduced scale relative to the original.

DESCRIPTION OF THE PRIOR ART

Existing scanners are capable of enlarging or reducing an original and producing one or more separations at a time, but are complex and expensive. Typically, an input drum carries an original picture which may be transparent or reflective. The original is illuminated by a light spot, and the transmitted or reflected light is converted into an electronic signal which represents the density of the original at the instantaneous position of the spot. In the case of a colour scanner, three such signals are derived, representing the red, green and blue densities at that spot. The input drum rotates, and the input illuminator and analyser traverse axially along the drum so as to scan the whole of the original in a spiral or raster format.

An output drum is rotated at the same speed as the input drum (or at a known and fixed speed relationship), and has mounted on it a film which is exposed by a modulated light source to form the desired representation of the original. The exposing system may generate a continuous tone image, or may comprise an electronic dot generating system to produce half-tone images. The exposing light is traversed axially along the drum at a fixed rate to expose every portion of the image. The enlargement or reduction of the image is carried out in the axial direction by moving the input analyser axially at a rate equal to the output axial rate divided by the enlargement required. In the circumferential direction, enlargement is achieved by digitising the input signal at a rate A, temporarily storing at least one circumferential line, and reading the stored signal out to the modulator at rate B, where A/B is the desired enlargement. Other signal processing may be carried out, for example to change the picture gradation, apply colour correction and to improve sharpness.

An alternative form of input scanner has the original carried on a flat platten, and a lens focuses an image of the original onto a line array of photodiodes or CCD elements. The original is illuminated either over its entire surface or along the line of the original which is targetted onto the array. The platten and array are moved relative to each other, and the output from the array is a stream on electrical signals representing the density seen by each array element in turn.

In the case of a colour scanner using an array, the filter carrying red, green and blue filters may be interposed between the original and the array and arranged to rotate in sequence with each line of data.

Since the array size is fixed, enlargement can be achieved by optically focusing the required line width of the original on the array, using a turret or zoom lens to cover the required range. At the same time, the relative motion between the platten and the array is scaled to achieve the required enlargement in this direction. Such a scheme is necessarily complex both mechanically and optically.

An alternative would be to store the entire image and to process this, using known image processing techniques, to the required scale. Such techniques are expensive, requiring large quantities of expensive memory (an A4 image at 300 lpi in colour contains over 25 MBytes), and are also time-consuming since the input, the processing, and the output are consecutive.

SUMMARY OF THE INVENTION

It is now been found that, surprisingly, only very little intermediate memory is required if the image is processed to scale in real time (i.e. with simultaneous input and output). The resulting economy in memory makes possible the construction of an enlarging or reducing scanner at a cost which cannot be achieved conventionally, which is simple mechanically, and which is quick.

According to the invention, an image scanning apparatus comprises an input image scanner for scanning an input image area with a beam of radiation and deriving from an image on at least part of the input image area a digital signal representing the image, an output image scanner for reproducing from said signal an output image on at least part of an output image area, the input image scanner and the output image scanner being arranged to scan the input and output image areas respectively simultaneously at a fixed relative rate, the output and input images being represented as a series of pixels arranged in orthogonal directions at fixed resolutions, and means in the data path between the input and output scanners for processing the digital signal to change the size of the output image relative to the input image, the processing means including a data store whose data capacity is substantially less than that required to hold data corresponding to an image covering the whole of the input image area.

In some circumstances, the data capacity of the store may be as little as about 15% of that required to hold data corresponding to an image covering the whole of the input image area.

The data path may include other signal processing means, for example for enhancing sharpness, colour correction (in the case of a colour scanner), and dot generation.

BRIEF DESCRIPTION OF THE DRAWINGS

The drawings illustrate diagrammatically a preferred embodiment of the invention. In the drawings:

FIG. 1 is a diagrammatic representation of a scanning apparatus in accordance with the present invention;

FIGS. 2A and 2B are diagrams illustrating the effect of enlargement of an image using an apparatus in accordance with the invention.

DESCRIPTION OF THE PREFERRED EMBODIMENT

Figure 3A:
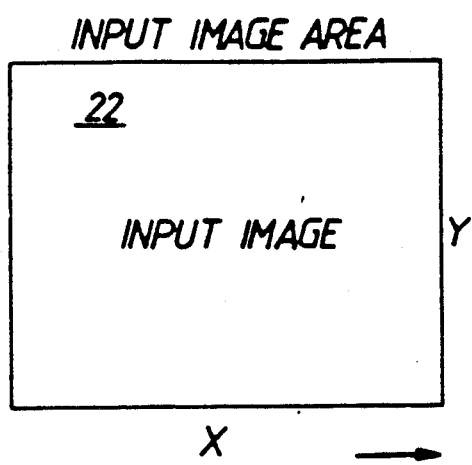
FIGS. 3A and 3B are diagrams illustrating the effect of reduction of an image using an apparatus in accordance with the invention.

Referring to FIG. 1, the apparatus comprises a movable platten 1 upon which the original may be mounted. The platten moves beneath a lens 2 and a CCD array 3 serving to scan the original image as it passes beneath. The resultant signal is passed to an analogue-to-digital converter 4 and thence to a processing stage 6, to which is connected a store 5. After an optional correction and dot generation stage 7, the output from the processing stage 6 is used to control an LED array 8 which includes a lens 9 to focus the beams from the LED as the array is moved along the surface of a rotating drum 10 bearing a light sensitive film. The LED array 8 and the platten 1 are rigidly connected so as to move together. The LED array 8 has at least one light beam.

To change the output image size, an image transformation is carried out by the processing stage 6. This involves the creation of a new set of image pixels, typically by interpolation. The signal processing stage 6 can also include sharpness enhancement. To produce a halftone image, dot generation may be carried out electronically in stage 7.

Consideration of FIGS. 2A and 2B illustrate the storage capacity required in the store 5. As illustrated, an original image 20 is to be enlarged to the size of the whole of the output image 21. Although enlargement is discussed, similar considerations apply for reduction. The maximum image size is X by Y. The enlargement is e. The original is smaller than the required output and contains fewer pixels (since the enlargement is reproduced at the same resolution as that at which the original is scanned). The output data must be created by expanding the original pixels, creating new ones by duplication or interpolation. Since both the input and the output scans proceed at the same rate, the input scan will be complete before the output, and sufficient data must be stored to finish the output. Note that both the input and the output start together.

When the input is complete, the output will have a distance $(X - X/e)$ to travel, where X is the maximum traverse direction and e is the enlargement. The output image area remaining is thus:

$$Y \times (X - X/e).$$

The input contains fewer pixels and the corresponding area is:

$$Y/e \times (X - X/e)/e$$

This corresponds to a required storage capacity of: $rY/e \times r(X - X/e)/e$ input pixels, where r is the resolution.

Thus storage $= r^2 XY(1/e^2 - 1/e^3)$ $= V(1/e^2 - 1/e^3)$ where $V = r^2 XY =$ the volume of data in the whole picture.

Differentiating with respect to the enlargement factor to find the maximum storage capacity required:

$$d/de \text{ (storage)} = k(2/e - 3/e^2)$$

$= 0$ when $3/e = 2$ or $e = 1.5$.

Using this value, the storage $= V((\tfrac{2}{3})^2 - (\tfrac{2}{3})^3) = 0.148 V$ Thus, for any degree of enlargement the necessary storage capacity is less than 15% of that required for the required picture.

In practice the enlargement capability will be limited by the increasing coarseness of the enlarged pixels. However, the application for which this system is most suited, the scanning of reflection copy originals, does not require a high degree of enlargement. A range of 20% reduction to 2 or 3 times enlargement is sufficient.

Figure 3B:
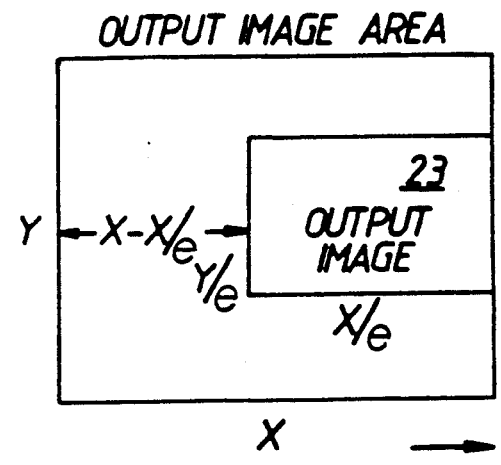

FIGS. 3A and 3B show the equivalent situation for a reduction of an input image 22 covering the whole of the input image area to a smaller output image 23, the reduction being 1/e. It can be shown similarly that the maximum data storage capacity required is identical for that in the enlargement case, but in this case output pixels are stored. Although the travel of the input and output scanners across the input and output image areas proceed together, the output image must be stored until the travel reaches a point such that the output image will not be finished before all the input image has been scanned, if the input image covers the whole input image area this can only be achieved by positioning the output image at the end of the output image area, as shown.

In practice a slightly larger store than the minimum will be necessary to allow for processing time and synchronisation.

Although the description above assumes that equal resolution is applied in the X and Y directions, and also equal input and output resolutions, it will be apparent that this is not necessarily the case. For example, it may be advantageous if higher enlargement is a requirement to use a CCD or photodiode array that has a higher resolution in the Y direction than that of the output. Equally, samples may be taken more frequently in the X direction. Either if these will improve the apparent output resolution, but will also increase the storage required.

I claim:

1. An image scanning apparatus, comprising an input image scanner for scanning an input image area with a beam of radiation and deriving from an image on at least part of the input image area a digital signal representing the image, an output image scanner for reproducing from said signal an output image on at least part of an output image area, the input image scanner and the output image scanner being arranged to scan the input and output image areas respectively simultaneously at a fixed relative rate, the output and input images being represented as a series of pixels arranged in orthogonal directions at fixed resolutions, and means in the data path between the input and output scanners for processing the digital signal to change the size of the output image relative to the input image, the processing means including a data store wherein the required data capacity of the store is less than 15% of that required to hold data corresponding to an image covering the whole of the input image area.

2. A method of scanning an image comprising the following steps:
    scanning an input image area with a beam of radiation to obtain a digital signal representing the input image;
    scanning an output image area simultaneously with, and at a fixed relative rate to, the scanning of the input image area;
    storing less than 15% of the digital signal required to hold the whole of the input image;
    processing the digital signal to change the size of the output image relative to the input image; and,
    reproducing from the digital signal an output image on at least part of the output image area.

3. An image scanning apparatus, comprising an input image scanner for scanning an input image area with a beam of radiation and deriving from an image on at least part of the input image area a digital signal representing the image, an output image scanner for reproducing from said signal an output image on at least part of an output image area, the input image scanner and the output image scanner being arranged to move together over the input and output image areas respectively simultaneously at the same rate, the output and input images being represented as a series of pixels arranged in orthogonal directions at fixed resolutions, and means in the data path between the input and output scanners for processing the digital signal to change the size of the output image relative to the input image, the processing means including a data store wherein the required data capacity of the store is less than 15% of that required to hold data corresponding to an image covering the whole of the input image area.

4. A method of scanning an image comprising the following steps:

scanning an input image area with a beam of radiation to obtain a digital signal representing the input image;

scanning an output image area simultaneously with, and at the same rate as, the scanning of the input image area;

storing less than 15% of the total data required to hold the whole of the input image;

processing the digital signal to change the size of the output image relative to the input image; and, reproducing from the digital signal an output image on at least part of the output image area.

* * * * *